W. S. BOYCE
TIE PLATE
Feb. 10, 1931. Re. 17,960
Original Filed Aug. 8, 1929
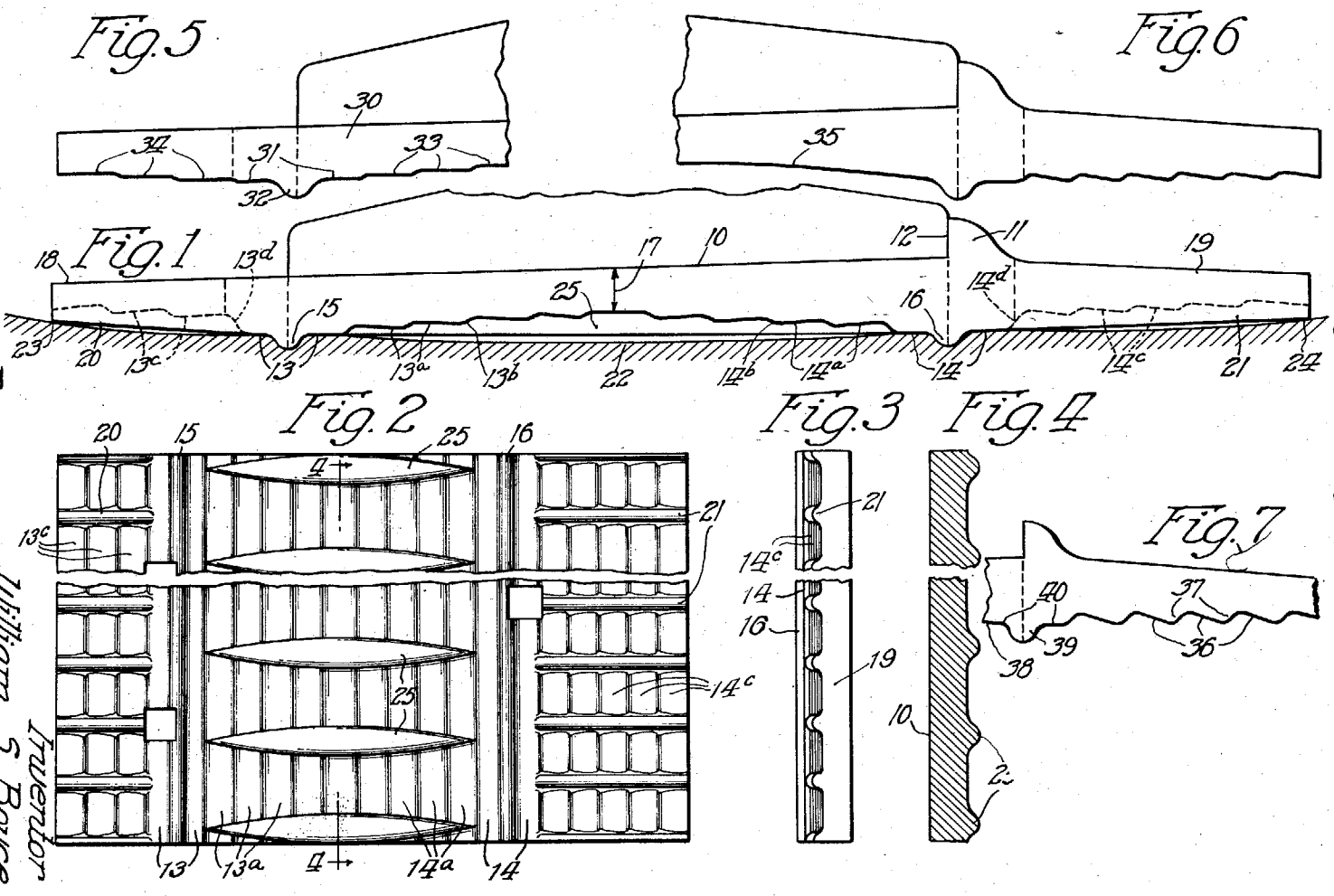
Inventor
William S. Boyce
By Fisher, Clapp, Somes & Pond Attys.

Reissued Feb. 10, 1931

Re. 17,960

UNITED STATES PATENT OFFICE

WILLIAM S. BOYCE, OF CHICAGO, ILLINOIS

TIE PLATE

Original No. 1,776,882, dated September 30, 1930, Serial No. 384,256, filed August 8, 1929. Application for reissue filed November 21, 1930. Serial No. 497,311.

This invention relates to railroad tie plates, and has for its main objects to provide an improved tie plate construction wherein the metal is distributed in a novel manner so as to secure the maximum of strength with the least weight of metal, thereby reducing the cost of the tie plates; to provide improved means for locking the tie plate to a tie so as to prevent shifting of the tie plate longitudinally of the tie; to provide an arrangement whereby the tie plate readily becomes embedded in the tie and locked against the said longitudinal shifting, as an incident to the passage of successive train loads over the rail portions supported by the tie plate and, in general, it is the object of my invention to provide an improved tie plate structure.

Other objects and advantages of my invention will be understood by reference to the following specification and acompanying drawing wherein I have illustrated a tie plate embodying a selected form of my invention, and also several modifications thereof.

In the drawing:

Fig. 1 is a side elevation.

Fig. 2 is a bottom plan of the plate shown in Fig. 1.

Fig. 3 is an end elevation.

Fig. 4 is a section on the line 4—4 of Fig. 2.

Figs. 5, 6 and 7 are side elevations of end portions of a tie plate embodying certain modifications of my invention.

Referring now to the drawing, my improved tie plate includes a rail bearing surface 10 on its top face and a flange 11 projecting upwardly therefrom to provide a rail abutting shoulder 12 adjacent one end of the rail seat 10. As shown, the rail seat 10 may be part of the entire top surface of the plate at one side of the shoulder 12, the same being preferably inclined or canted slightly.

On the bottom of the tie plate, tie bearing surface is provided, and this may be a flat surface directly below the rail seat 10, but I prefer to provide a pair of transversely extending relatively narrow primary tie bearing surfaces. These primary bearing surfaces are spaced longitudinally of the plate and located approximately beneath the edges of the base flanges of a rail seated on said rail seat.

In the present instance, the primary tie bearing surfaces are indicated at 13 and 14, these tie bearing surfaces being provided with depending ribs 15 and 16 which extend transversely of the plate, and, in effect, divide the primary bearing surfaces 13 and 14 into two portions, one on each side of each rib. The ribs 15 and 16 are preferably blunt or rounded as shown, and are adapted to be embedded in a railroad tie without cutting the fibers thereof. The ribs 15 and 16, being comparatively narrow, may be readily embedded by one or two blows with a sledge hammer, whereby the tie plate is initially held against shifting longitudinally of the tie.

The bottom face of the central or median portion of the tie plate, that is, the portion between the initial or primary bearing surfaces 13 and 14, is preferably arched so as to reduce the thickness of the plate from its maximum thickness at the respective primary bearing surfaces to a minimum thickness as indicated at 17 at an intermediate point in the length of the tie plate. The arched bottom surface may be a smooth or regular curved surface, but I prefer to provide the said arched bottom surface with a plurality of stepped, secondary or auxiliary tie bearing seats, such as indicated at $13^a$ and $14^a$. These secondary seats $13^a$ and $14^a$ are progressively stepped upwardly and inwardly towards the middle portion of the rail seat of the plate from the respective primary tie bearing seats 13 and 14 so as to provide oppositely facing shoulders $13^b$ and $14^b$ which define the respective secondary seats. By preference, the seats $13^a$ and $14^a$ are inclined downwardly and inwardly so as to provide connecting shoulders $13^b$ and $14^b$ of increased depth as compared with the depth of such shoulders when the seats are disposed in substantially horizontal planes as shown in Fig. 5.

The bottoms of the respective end portions 18 and 19 may be treated in any desirable manner, but I prefer to incline the same upwardly and outwardly and to provide the same with stepped secondary tie bearing seats such as shown at $13^c$ and $14^c$. The secondary stepped tie bearing seats $13^c$ and $14^c$ may be of the same general formation as those on the bottom face of the median portion of the plate, but the said end portion seats incline downwardly and outwardly with respect to the respective primary tie bearing surfaces 13 and 14.

The end portions 18 and 19, if stepped down to the extent shown in Fig. 1 in the drawing, would probably be considered too thin and to lack sufficient strength to prevent bending or breaking of the said end portions. In order to overcome such objection, the said end portions may be provided with a plurality of transversely spaced, longitudinally extending ribs 20 and 21 which are formed integral with the tie plate. In this manner, there is an effective thickness equal to the combined thickness of the stepped end portion and the rib, whereby the strength of the said end portions is such that the above mentioned objection is overcome.

The stepped and ribbed formation of the end portions of the plate may otherwise be described as being recessed and stepped so as to leave the projecting ribs 20 and 21. As shown in Fig. 1, the stepped seats $13^c$ and $14^c$ are recessed from the bottom faces of the ribs 20 and 21 so that abrupt shoulders $13^d$ and $14^d$ are formed joining the respective primary seats 13 and 14 with the secondary seats $13^c$ and $14^c$. The abrupt shoulders $13^d$ and $14^d$, and the shoulders which define the respective seats, constitute, in effect, depending ribs extending transversely of the plate, which serve in cooperation with the depth of the ribs 15 and 16 to effectively hold the plate against longitudinal shifting when the plate has been embedded in the tie. It is quite possible, as a practical matter, to provide a combined shoulder and rib width equal to or greater than the width of the usual triangular or similarly shaped ribs provided on conventional tie plates. Embedment of the longitudinally spaced shoulders is more readily accomplished than is embedment of a single continuous shoulder of a depth equal to the combined depth of the spaced shoulders, since less abrupt distortion of the fibers of the tie is required than is the case with the ribs found on conventional tie plates.

As a practical matter, railroads often lay rails directly on wood ties without interposing a tie plate between the bottom of the rail and the tie. During use, the rail gradually cuts into the tie. This is objectionable, and if not stopped, soon cuts such a deep recess in the tie that the latter must be removed and discarded. In order to prevent such continued cutting into the tie, tie plates such as concerned in the present invention may be interposed between the rail and the tie, this being done in actual practice by first adzing or gouging out the top of the tie so as to eliminate the rail-formed recess, the result being that an irregular or arcuate surface is left where the tie plate should be seated. In order that the tie plate will the better seat on such an arcuate surface, I prefer to provide the ends thereof with the above described upwardly and outwardly inclined bottom portions which will approximately conform to the adjacent arched tie surface portions.

In Fig. 1, I have shown a condition wherein the arched tie surface is indicated at 22, the tie plate having its ribs 15 and 16 embedded in the tie to prevent longitudinal shifting, the plate being also seated on the tie at its primary tie-bearing seats 13 and 14. In this instance, I have also shown the ends of the tie plate as being seated on the tie as indicated at 23 and 24. The points of engagement between the ends of the tie plate and tie are obviously comparatively reduced areas at the bottom edges of the longitudinally extending ribs 20 and 21. Since these ribs extend lengthwise of the tie, that is, with the grain thereof, it will be seen that embedment of the primary seats 13 and 14 will not be materially hindered by the said points of engagement at the ends of the tie plate since the ribs 20 and 21 can be comparatively easily forced into the tie, it being a comparatively easy matter to separate the fibers of the tie as compared with distorting without cutting them, as done by the ribs 15 and 16 and primary tie-bearing seats 13 and 14. Hence, successive train loads passing over the supported rail portions will gradually embed the successive stepped seats in the tie, whereby the shoulders which define the various stepped seats will become effective to hold the tie plate against shifting longitudinally. Obviously, the end ribs 20 and 21 will serve to prevent transverse shifting, and, if desired, the median portion of the plate may be provided with transversely spaced, longitudinally extending ribs 25 which serve to reinforce the said median portion.

In Fig. 5, I have shown a slightly modified form of construction wherein the tie plate, a portion of which is indicated at 30, is provided with primary tie-bearing seats such as shown at 31 and initial-embedment ribs 32 substantially similar in their relative arrangement to the corresponding parts shown in Fig. 1. In this modified form, secondary tie-bearing seats indicated at 33 and 34 are provided, these being substantially horizontally disposed, while at the same time being progressively stepped upwardly, the seats 33 being stepped upwardly and inwardly from the primary seat 31, and the secondary seats 34 being stepped upwardly and outwardly from the said primary seat. Also, in this modification, I have shown the bottom of the end portion outside of the rib 32 and primary surface 31 as being formed without longitudinally extending ribs, the recessing of the steps being omitted in this case so that there is a more gradual taper to the end of the tie plate, the thickness being thereby maintained greater than in the structure shown in Fig. 1.

In Fig. 6, I have shown another modification wherein the bottoms of the ends of the plate are provided with stepped secondary seats which are inclined downwardly and outwardly as in the form shown in Fig. 1, but wherein there is no longitudinal recess of the said bottoms or provision of longitudinally extending ribs. The desired thickness of the end portions is thus maintained throughout the width of the plate, this being desirable in the opinion of some railroad executives. In Fig. 6, I have also shown the bottom of the median portion of the tie plate as being provided with a smooth arcuate surface 35 instead of a stepped arched surface as shown in Fig. 1.

It will be seen that the tie plate structure in each of the forms shown in Figs. 1, 5 and 6 is such that each is well adapted to being seated on a tie having an arched seat such as described in connection with Fig. 1. Also, it will be understood that embedment of each of these forms of tie plate will begin at the initial embedment of the ribs followed by the primary seats and secondary seats, the embedment being gradual as successive train loads force the tie plate into the tie. When all of the primary and secondary seats have been embedded so that the entire bottom surface of the plate is supported by direct contact with the tie, there will be no further appreciable embedment of the plate because of the large area of contact between the plate and tie. In the structure of Fig. 6, the arcuate median bottom surface 35 constitutes a secondary tie-engaging surface which is gradually embedded in a manner well understood by those skilled in the art, and that portion of the arcuate surface 35 immediately adjacent the inside face of the rib may be considered a primary tie-bearing surface.

In Fig. 7, I have illustrated a further modified construction for the end portions of the plate, the bottoms thereof, in this instance, being provided with tie-bearing surfaces 36 which are joined by shoulders 37, the said tie-bearing surfaces 36 being in a stepped arrangement wherein the said surfaces or seats are inclined downwardly or outwardly towards the end of the plate and arranged with their outermost edges in a substantially horizontal plane. The median portion of the tie plate may be arched on its bottom as indicated at 38 or treated in any other desirable manner. This form of structure has the advantage of having ample shoulder area to prevent longitudinal shifting of the tie plate while also being such that the end portions are more readily embedded in the tie than the ribs and primary seat portions such as indicated at 39 and 40 respectively.

Tie plates embodying the above described forms of my invention are effectively locked against shifting longitudinally of the ties on which they are seated, by embedment in the tie of a plurality of offset formations which are disposed above the bottom plane of the primary tie-bearing seats and which formations extend transversely of the tie plates.

The step arrangement herein disclosed, especially that illustrated in Figures 1 and 7, may be described broadly as an arrangement of alternately disposed ridges and furrows which are adapted to compress the fibers of the tie to conform therewith so as to interlock the plate and tie, substantially as described.

Each of the inwardly and outwardly facing offset areas is of a comparatively small vertical depth which, of itself, may readily be embedded in the tie without cutting or breaking the tie fiber, whereby the serviceable life of the tie is materially prolonged. By reason of the longitudinal spacing of the offsets, the combined depth of all of the embedded offsets is distributed more or less uniformly longitudinally of the tie plate area, so that cutting or breaking of the tie fibers is practically eliminated.

Preferably, the offsets are so arranged that their respective bottoms are offset vertically, as in the tie plate structures having upwardly inclined bottom portions (Figures 1, 5 and 6) whereby the offsets are successively or progressively engageable with the tie and adapted to be embedded therein in different horizontal planes. The tie portions intermediate adjacent offsets arranged in this manner are not likely to be chipped away as an incident to relative movement of the plate and tie under normal service conditions.

While the secondary engaging seating surfaces disclosed in Figures 1, 5 and 6 are stepped, and perhaps the secondary seating surface of Figure 7 can not be accurately characterized as stepped, it will be noted, however, that each of the seating surfaces is saw-toothed with the shoulders of the toothed-portion facing away from the adjacent primary seating surface.

In all of the above described forms, it will be understood that the shoulders and other surfaces joining relatively offset surfaces are rounded or blunt so that there will be no tie-cutting action which is considered objectionable in that it weakens the tie and shortens its life.

The above described tie plate structures are highly desirable, in that the metal is distributed in such a way that maximum strength is retained where most needed, i. e., directly under and adjacent the edges of the base flanges of a rail mounted on the tie plate. The arrangements disclosed also serve to obtain said maximum strength while at the same time reducing the weight of the plate because of the novel arrangement of stepped seats, the inclined seat arrangement being effective to save slightly more metal than is the case with the horizontal stepped seat arrangement. By saving metal, the cost of the plates can be materially reduced, this being a most important consideration from a commercial standpoint.

I am aware that changes may be made in the above described structure without departing from the spirit of my invention, the scope of which should be determined by reference to the following claims, construing the same as broadly as possible consistent with the state of the art.

I claim as my invention:

1. A tie plate having a primary tie-bearing seat on its bottom face, and a plurality of secondary, transversely extending stepped tie-bearing seats on the bottom of the end portions of the plate outside of said primary tie-bearing surface, said stepped seats being progressively stepped upwardly towards the ends of the plate, said primary and secondary stepped seats being adapted to be successively seated on and embedded in the tie as an incident to the passage of successive train loads over the rail portion supported by the tie plate, said stepped seats being defined by shoulders extending between adjacent seats, and said shoulders serving, when the seats are embedded in the tie, to hold the plate against shifting longitudinally of the tie.

2. A tie plate according to claim 1, wherein the stepped seats are inclined downwardly and outwardly, whereby the shoulders between the seats are increased in area so as to afford increased holding power to prevent longitudinal shifting of the tie plate relative to the tie.

3. A tie plate having a pair of spaced, transversely extending primary tie-bearing seats on its bottom face and intermediate its length, and a plurality of secondary, stepped tie-bearing seats on the bottom of the end portions of the plate outside of said primary tie-bearing surfaces, said stepped seats being progressively stepped upwardly towards the ends of the plate, said primary and secondary stepped seats being adapted to be successively seated on and embedded in the tie as an incident to the passage of successive train loads over the rail portion supported by the tie plate, said stepped seats being defined by shoulders extending between adjacent seats, and said shoulders serving, when the seats are embedded in the tie, to hold the plate against shifting longitudinally of the tie.

4. A tie plate having a pair of spaced, transversely extending primary tie-bearing seats on its bottom face and intermediate its length, and a plurality of secondary, stepped tie-bearing seats on the bottom of the end portions of the plate outside of said primary tie-bearing surfaces, said stepped seats being progressively stepped upwardly towards the ends of the plate whereby the thickness of said end portions is gradually reduced towards said ends, the bottom of the plate portion intermediate said primary tie-bearing surfaces being arched longitudinally of the plate so as to reduce the thickness thereof intermediate said primary tie-bearing seats, said primary and secondary stepped seats being adapted to be successively seated on and embedded in the tie as an incident to the passage of successive train loads over the rail portion supported by the tie plate, said seats being defined by shoulders extending between adjacent seats, and said shoulders serving, when the seats are embedded in the tie, to prevent shifting of the plate longitudinally of the tie.

5. A tie plate having a pair of spaced, transversely extending primary tie-bearing surfaces on its bottom face and intermediate its length, ribs extending longitudinally of said primary seats, depending therefrom and adapted to be embedded in a tie to initially hold the tie plate against shifting longitudinally of the tie, and a plurality of secondary, stepped tie-bearing seats on the bottom of the end portions of the plate outside of said primary tie-bearing surfaces, said stepped seats being progressively stepped upwardly towards the ends of the plate, said primary and secondary stepped seats being adapted to be successively seated on and embedded in the tie as an incident to the passage of successive trainloads over the rail portion supported by the tie plate, said seats being defined by shoulders extending between adjacent seats, and said shoulders serving, when the seats are embedded in the tie, to prevent shifting of the plate longitudinally of the tie.

6. A tie plate according to claim 5, wherein the stepped seats are inclined downwardly and outwardly, whereby the shoulders between the seats are increased in area so as to afford increased holding power to prevent longitudinal shifting of the tie plate relative to the tie.

7. A tie plate having a primary tie-bearing seat on its bottom face, and a plurality of transversely extending stepped seats on the bottoms of its end portions, said stepped seats being inclined downwardly and outwardly whereby the outer edges of said seats initially engage the tie, and embedment thereof is gradual, whereby embedment of said primary seat is not materially hindered by said secondary seats.

8. A tie plate having a pair of spaced, transversely extending primary tie-bearing seats on its bottom face and intermediate its length, ribs extending longitudinally of and depending from said primary seats and adapted to be embedded in a tie to initially hold the tie plate against longitudinal shifting, and a plurality of secondary stepped tie-bearing seats on the bottom of the tie plate on opposite sides of each of said primary tie-bearing surfaces, the steps on said end portions being progressively stepped upwardly towards the ends of the plate, and the steps on the median portion of the plate being progressively stepped upwardly towards the middle of said median portion, the longitudinal cross section of the tie plate being thereby, in effect, gradually tapered from maximum thickness at said primary seats to minimum thickness at its opposite ends and intermediate said primary seats, said primary and secondary stepped seats being adapted to be successively seated on and embedded in a tie as an incident to the passage of successive trainloads over the rail portion supported by the tie plate, said stepped seats being defined by shoulders extending between adjacent seats, and said shoulders serving, when the seats are embedded in the tie, to hold the tie plate against longitudinal shifting movement.

9. A tie plate having a pair of spaced, transversely extending primary tie-bearing surfaces on its bottom face and intermediate its length, and a plurality of secondary, stepped tie-bearing seats on the bottom of the end portions of the plate outside of said primary tie-bearing surfaces, said stepped seats being progressively stepped upwardly towards the ends of the plate whereby the thickness of said end portions is gradually reduced towards said ends, the bottom of the plate portion intermediate said primary tie-bearing surfaces being arched longitudinally of the plate so as to reduce the thickness thereof at a point intermediate said primary tie-bearing seats, one or more longitudinally extending ribs depending from said arched intermediate portion for reinforcing the same, said primary and secondary stepped seats being adapted to be successively seated on and embedded in the tie as an incident to the passage of successive trainloads over the rail portion supported by the tie plate, said seats being defined by shoulders extending between adjacent seats, and said shoulders serving, when the seats are embedded in the tie, to prevent shifting of the plate longitudinally of the tie.

10. A tie plate having a pair of spaced, transversely extending ribs depending from the bottom of said tie plate intermediate its length, primary tie-bearing surface portions on the bottom of said plate adjacent said ribs, the bottom faces, as a whole, of the opposite end portions of the tie plate being inclined upwardly and outwardly, said inclined bottom faces being provided with a plurality of stepped, transversely extending, secondary tie-bearing seats defined by shoulders extending between adjacent seats, said primary and stepped secondary seats being adapted to be successively seated on and embedded in the tie as an incident to the passage of successive trainloads over the rail portion supported by the tie plate, said shoulders serving, when the seats are embedded in the tie, to hold the tie plate against shifting longitudinally of the tie.

11. A tie plate having a pair of spaced, transversely extending primary tie-bearing surfaces on its bottom face and intermediate its length, and a plurality of secondary stepped tie-bearing seats on the bottom of the end portions of the plate outside of said primary tie-bearing surfaces, said primary and secondary stepped seats being adapted to be successively seated on and embedded in the tie as an incident to the passage of successive trainloads over the rail portion supported by the tie plate, said seats being defined by shoulders extending between adjacent seats, and said shoulders serving, when the seats are embedded in the tie, to prevent shifting of the plate longitudinally of the tie, said end portions being also provided with a plurality of transversely spaced, longitudinally extending ribs depending from said stepped seats, said ribs serving to reinforce said end portions and also constituting initial tie-bearing surfaces at the ends of the plate serving to support said end portions without materially hindering embedment thereof.

12. A tie plate having a pair of transversely extending, longitudinally spaced initial tie-bearing seats on its bottom face, said seats being located intermediate the length of the plate, the bottoms of the end portion of the plate outside of said primary seats being inclined upwardly and outwardly, and the median portion of the plate being generally arched upwardly and provided with a plurality of stepped, secondary seats, said seats being progressively stepped upwardly from the respective primary seats towards the middle of said median portion, said seats being defined by shoulders extending between adjacent seats, which shoulders, when the respective seats are embedded in a tie, serve to hold the tie plate against longitudinal shifting relative to the tie.

13. A tie plate according to claim 12, wherein the stepped seats are inclined downwardly and inwardly, whereby the shoulders between the seats are increased in area so as to afford increased holding power to prevent longitudinal shifting of the tie plate relative to the tie.

14. A tie plate according to claim 8, wherein the stepped seats on the end portions are inclined downwardly and outwardly, and the stepped seats on the median portion being inclined downwardly and inwardly, whereby the shoulders between the seats are increased in area so as to afford increased holding power to prevent longitudinal shifting of the tie plate relative to the tie.

15. A tie plate having its bottom provided with a primary tie-engaging part, an adjacent portion of said bottom being inclined upwardly from said primary tie-engaging part and provided with an offset forming an area having a vertical depth, said offset being spaced longitudinally of the tie plate from said primary tie-engaging part and being adapted to be embedded in a tie for interlocking the tie plate with the tie to prevent shifting of the plate longitudinally of the tie.

16. A tie plate having its bottom provided with a plurality of offsets forming areas having a vertical depth, said offsets being spaced longitudinally of the plate and being adapted to be embedded in a tie for interlocking the plate with the tie to prevent shifting movement of the plate longitudinally of the tie, said offsets being so arranged that the adjacent offsets will be embedded in the tie in vertically offset zones.

17. A tie plate having its bottom provided with a plurality of offsets forming areas having a vertical depth, said offsets being spaced longitudinally of the plate and being adapted to be embedded in a tie for interlocking the plate with the tie to prevent shifting movement of the plate longitudinally of the tie, the bottoms of said offsets being successively higher as their distances from said primary tie-engaging part increase.

18. A tie plate having a transversely extending, narrow portion of maximum thickness located in the zone of greatest normal stress on the plate, the bottom of the plate on one side of said narrow portion being recessed so as to gradually reduce the thickness of the plate as the distance from said narrow portion increases and so as to provide a plurality of alternate ridges and furrows extending transversely of the plate.

19. A tie plate having a transversely extending, narrow portion of maximum thickness located in the zone of greatest normal stress on the plate, the bottom of the plate on one side of said narrow portion being recessed so as to gradually reduce the thickness of the plate as the distance from said narrow portion increases and so as to provide a plurality of alternate ridges and furrows extending transversely of the plate, said ridges being so positioned as to be successively engageable with a tie subsequent to initial embedment in the tie of the bottom portion of said narrow zone of maximum thickness.

20. A tie plate having a transversely extending, narrow portion of maximum thickness located in the zone of greatest normal stress on the plate, the bottom of the plate on opposite sides of said narrow portion being recessed so as to gradually reduce the thickness of the plate as the distance from said narrow portion increases and so as to provide a plurality of alternate ridges and furrows extending transversely of the plate, said ridges being so positioned as to be successively engageable with a tie subsequent to initial embedment in the tie of the bottom portion of said narrow zone of maximum thickness.

21. A tie plate having a transversely extending, narrow portion of maximum thickness located in the zone of greatest normal stress on the plate, an adjacent portion of its bottom being provided with a plurality of alternately arranged ridges and furrows extending transversely of the plate, spaced longitudinally thereof and disposed above the bottom plane of said transversely extending, narrow portion for interlocking the tie plate with a supporting tie to prevent longitudinal shifting of the plate relative to the tie.

22. A tie plate having its bottom provided with a primary tie engaging seating surface extending transversely across the plate, and a secondary tie engaging seating surface, said secondary seating surface having a series of depending shoulders extending transversely of the plate and dividing the secondary seating surface into a series of tie engaging seating surfaces.

23. A tie plate having its bottom provided with a primary tie engaging seating surface extending transversely across the plate and secondary tie engaging seating surfaces disposed at opposite sides of the primary seating surface, each secondary seating surface having a series of depending shoulders extending transversely of the plate and dividing the secondary seating surface into a series of tie engaging seating surfaces, the shoulders of the secondary seating surfaces facing in opposite directions respectively.

24. A tie plate having its bottom provided with a primary tie engaging seating surface extending transversely across the plate, and a secondary tie engaging seating surface, said secondary seating surface being saw-toothed, each saw tooth extending transversely across the tie plate, and the shoulders of the saw-toothed portions facing away from the primary seating surface.

25. A tie plate having its bottom provided with a primary tie engaging seating surface extending transversely across the plate, and secondary tie engaging seating surfaces disposed at opposite sides of the primary seating surfaces, each secondary seating surface being saw-toothed with the teeth extending transversely across the plate in substantial parallelism with the primary seating surface, the shoulders of the toothed portions of the secondary seating surfaces facing in opposite directions respectively.

26. A tie plate having its bottom provided with a primary tie engaging seating surface extending transversely of the plate, and a secondary tie engaging seating surface, the said secondary seating surface being stepped upwardly and away from said primary seating surface.

27. A tie plate having its bottom provided with a primary tie engaging seating surface extending transversely of the plate, and secondary tie engaging seating surfaces at opposite sides of the primary seating surface, each secondary seating surface being stepped upwardly and away from the primary seating surface.

WILLIAM S. BOYCE.